April 6, 1965   J. J. DUERO ETAL   3,177,005
LEAF SPRING ATTACHMENT TO VEHICLE FRAME
Filed May 14, 1963
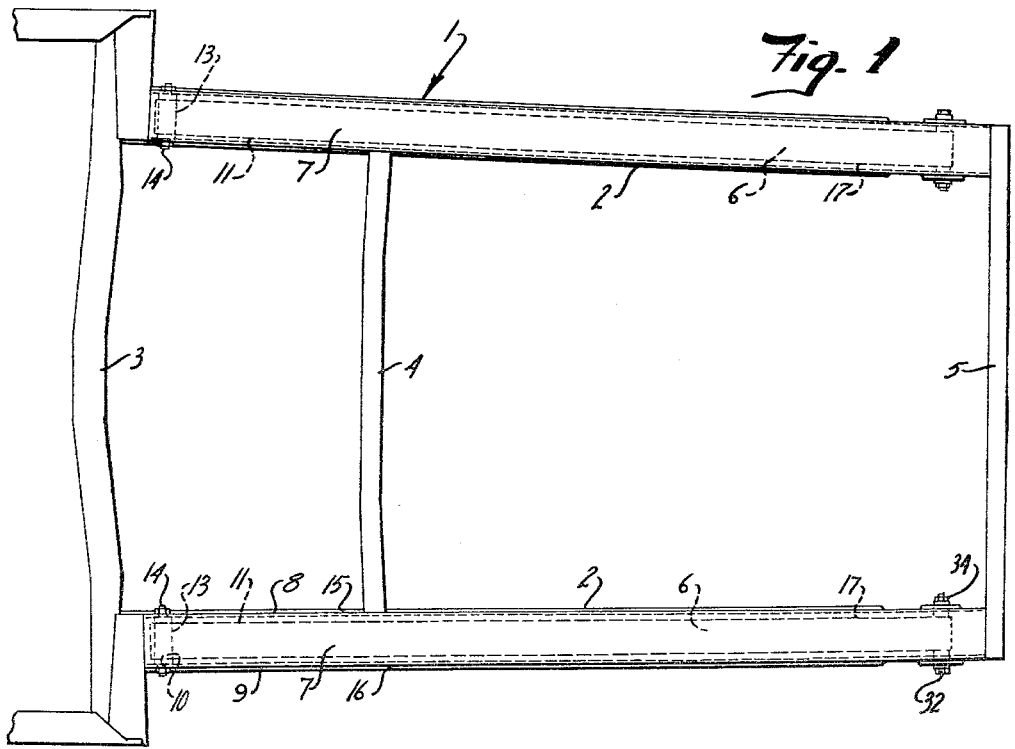
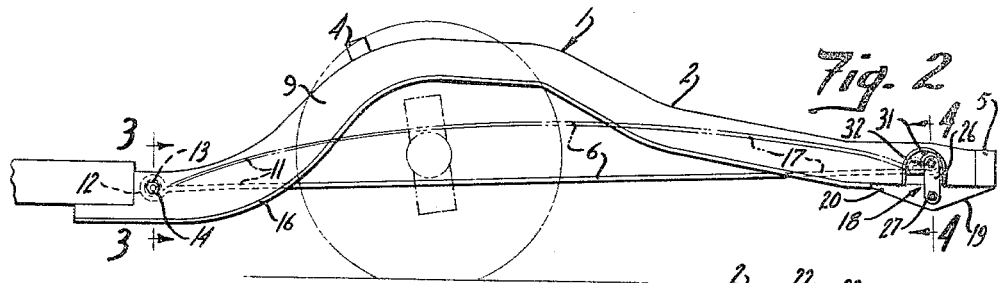
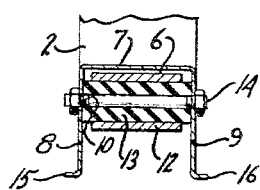
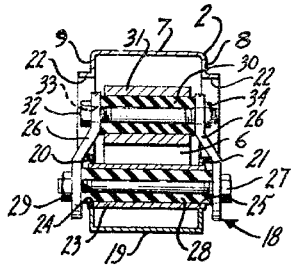
INVENTOR.
JOHN J. DUERO
WILLIAM G. PIERCE
BY
Howard J. Barnett
Attorney

United States Patent Office 3,177,005
Patented Apr. 6, 1965

3,177,005
LEAF SPRING ATTACHMENT TO
VEHICLE FRAME
John J. Duero and William G. Pierce, Whitefish Bay,
Wis., assignors to A. O. Smith Corporation, Milwaukee,
Wis., a corporation of New York
Filed May 14, 1963, Ser. No. 280,247
1 Claim. (Cl. 280—106.5)

This invention is directed to a leaf spring attachment to a vehicle frame, and more particularly to a leaf spring in which the attachment is disposed inside the associated frame elements, thereby making additional space available in the vehicle.

Increased space utilization in a vehicle is of significant value, and with the increasing trend towards smaller vehicles, it is desirable that every inch of potential space be available either for a vehicle element, a passenger, or luggage. As vehicle passenger and luggage space requirements continue to expand, and vehicles continue to shrink, the problem becomes most critical.

This invention is directed specifically to a leaf spring hanger design in which one or both ends of the leaf spring nest inside a channel or hat section member frame element, rather than being mounted on a conventional spring hanger bracket. The usual spring hanger bracket projects out from the frame, and, therefore, occupies additional space. In applicants' construction the extra bracket is eliminated, and its function is supplied by the channel section frame element to which the leaf spring is attached.

The elimination of the extra bracket, and the nesting of the ends of the spring inside the frame element provide additional trunk space in a typical "compact," or small passenger vehicle. The extra space is obtained without sacrificing either frame strength or the stability of the suspension system.

Various modes of carrying out the invention are contemplated, but the following description is directed to the presently preferred embodiments of the invention.

In the drawings:
FIGURE 1 is a plan view of the rear portion of a vehicle frame incorporating the invention;
FIG. 2 is a side view of FIGURE 1;
FIG. 3 is a section taken on line 3—3 of FIG. 2;
FIG. 4 is a section taken on line 4—4 of FIG. 2; and
FIG. 5 is an enlarged fragmented side view of the rear end spring attachment shown in FIGS. 2 and 4.

As shown in the drawings, a vehicle frame 1 includes a pair of rear side rails 2. Each rear side rail 2 is generally channel shaped in section and opens downwardly as shown best in FIG. 3. Also included in the frame 1 are a plurality of cross bars 3, 4 and 5, which provide lateral rigidity for the frame, and distribute the stresses from the suspension system into the frame.

As is seen in FIGURE 1, a leaf spring 6 is disposed directly under the rear side rail 2. The rails 2, viewed in section, each comprise a web 7 and flange portions 8 and 9. Aligned bolt openings 10 are disposed in the respective flanges 8 and 9 at the point where the attachment of the forward end 11 of the leaf spring 6 is desired.

The vehicle leaf spring 6 is disposed with its forward end 11 inside the channel rear side rail 2. The end 11 of spring 6 includes a spring eye 12, through which a spring hanger bushing 13 extends. A spring hanger bolt 14 extends through the bushing 13, and through the aligned bolt openings 10 in the flange portions 8 and 9 of the rear side rail 2. The end of bolt 14 is secured as shown in FIG. 3 to provide a leaf spring mounting which eliminates a spring hanger bracket, and conserves space by nesting the spring end inside the side rail 2 of the frame 1.

The channel rear side rail 2 is shown with a pair of additional reinforcing flanges 15 and 16 in FIG. 3, to define a hat-shaped cross section. The additional side flanges 15 and 16 are used when additional reinforcement of the frame is required.

The rear attachment of end 17 of the leaf spring 6 shown in FIGURE 1 is of shackle-type construction to provide increased clearance for full spring movement. However, the concept of conserving space by nesting the spring end 17 inside the side rail 2 is fully utilized, as will be seen in FIGS. 4 and 5. The rear spring connection to the rail 2 includes a tension-type shackle assembly 18 which extends upwardly from a pivot point inside an inverted channel extension 19 welded to the bottom edge of the rear end of each side rail 2 at flanges 20 and 21 to enclose the shackle assembly 18. The flanges 8 and 9 of the side rail 2 each have an oversized opening 22 to provide clearance for the movement of shackle assembly 18. It can been seen the the nesting construction of the invention permits spring movement, while avoiding the necessity for sharper kick-up of the side rail 2 under the vehicle trunk. Because of the increased spring clearance provided by the combined effect of nesting the end 17 of spring 6 inside the open channel side rail 2, and suspending the end 17 on the shackle assembly 18, maximum trunk space is available above the side rails 2. As can be seen in FIG. 2, sufficient clearance is thereby available even when the spring 6 is in full jounce position.

The tension-type shackle assembly 18 includes a metal sleeve 23 which extends between aligned openings 24 and 25 in the inverted channel extension 19 of each rear side rail 2, and is welded thereto. A pair of links 26 are pivotally connected by means of a bolt 27 to the channel extension 19 and extend upwardly therefrom. The bolt 27 also extends through the bushing 23 and the aligned openings 24 and 25 to pivotally secure the links 26 to the extension 23 of side rail 2. A rubber sleeve 28 is disposed between the inside surface of metal sleeve 23 and the bolt 27, as shown in FIG. 4, and the end of bolt 27 is held in place by means of a lock nut 29.

The links 26 converge towards each other as they extend upwardly from openings 24 and 25, and a second rubber sleeve 30 is disposed between the upper ends of the links 26, and extends through rear spring eye 31. A spring attachment bolt 32 extends through the second rubber sleeve 30 and through aligned openings 33 in the respective links 26. Spring attachment bolt 32 is held in place by a rear lock nut 34.

The tension-type shackle assembly 18 effectively lowers the rear end 17 of the spring 6 so that more trunk space is available to carry additional cargo. Also, the trunk floor space, which is limited in a compact vehicle, can be made flat, and wider, to accommodate more and larger luggage items.

Various modes of carrying out the invention are contemplated as being within the scope of the following claim particularly pointing out and distinctly claiming the subject matter which is regarded as the invention.

We claim:
In a low ground clearance passenger vehicle, a space-conserving vehicle leaf spring suspension system comprising, first and second downwardly opening channel member side rails, each having a generally horizontal web portion and a pair of generally vertical flanges disposed in a generally parallel configuration and parallel to the longitudinal axis of the vehicle, said channel members each having upwardly bowed intermediate portions to provide clearance for a vehicle axle disposed transversely thereto, each channel member having forward and rear end portions disposed in a horizontal plane gen- erally coinciding with the plane of said vehicle axle, a pair of leaf springs each having first and second end portions and intermediate portions, said leaf springs being disposed to extend between the forward and rear end portions of the respective channel members and traversing the bowed intermediate portion, the respective end portions of said leaf springs being nested inside the respective end portions of said channel members between the vertical flanges thereof, all parts of said leaf springs being disposed above the lowest level of said frame element at all times pivotal attachment means connecting the front and rear end portions of said leaf springs to the forward and rear end portions of the respective downwardly opening channel member side rails, said pivotal attachment means being disposed between the vertical side flanges of said side rails at least one of said pivotal attachment means utilizing only the flange portions of said side rails for direct attachment of the spring end to said side rail, whereby a spring attachment bracket is eliminated, and whereby a leaf spring suspension of minimum height, length and width is provided.

References Cited by the Examiner
UNITED STATES PATENTS

| | | | |
|---|---|---|---|
| 1,142,337 | 6/15 | Layman | 280—106.5 |
| 1,552,645 | 9/25 | Powell | 280—106.5 X |
| 2,407,092 | 9/46 | McNamara | 280—106.5 X |
| 2,417,690 | 3/47 | Keller | 267—56 X |
| 2,954,998 | 10/60 | Kushler | 280—106.5 |

MILTON BUCHLER, *Primary Examiner.*

A. HARRY LEVY, *Examiner.*